No. 670,866. Patented Mar. 26, 1901.
P. W. TILLINGHAST.
PNEUMATIC TIRE.
(Application filed Apr. 24, 1897.)

(No Model.)

WITNESSES.
Alva L. Burdick
S. K. Dalgliesh

INVENTOR.
Pardon W. Tillinghast

UNITED STATES PATENT OFFICE.

PARDON W. TILLINGHAST, OF EDGEWOOD, RHODE ISLAND.

PNEUMATIC TIRE.

SPECIFICATION forming part of Letters Patent No. 670,866, dated March 26, 1901.

Application filed April 24, 1897. Serial No. 633,798. (No model.)

*To all whom it may concern:*

Be it known that I, PARDON WILBUR TILLINGHAST, a citizen of the United States, residing at Edgewood, in the town of Cranston, county of Providence, and State of Rhode Island, have invented a new and useful Improvement in Pneumatic Tires, of which the following is a specification.

My invention relates to that class of tires which are commonly called "double tube," that can be quickly detached from the rim and held in place on the rim without the use of cement. In this class of tires it is customary to employ a sheath or strengthening-jacket for the air-tube. This sheath is divided along its inner circumference, and the edges of the sheath are provided with beads that coöperate with the rim to hold the sheath in engagement. In all tires of this class they are detached by exerting an inward and sidewise pressure and a sudden side slip or strain, as in turning a corner, is liable to roll the tire from the rim. These side strains are on one side at a time only, and a pressure on one side tending to disengage that edge of the tire-sheath exerts an equal pressure on the opposite edge to hold it in place. I take advantage of this fact and make the sheath edges dependent on each other, so that both sides of the sheath must be simultaneously pressed inward before either side can be detached, thus making it impossible to accidentally displace the tire.

Figure 1:
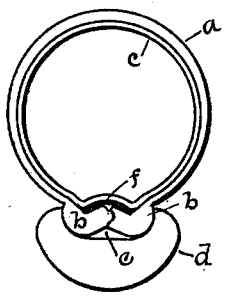
Figure 2:
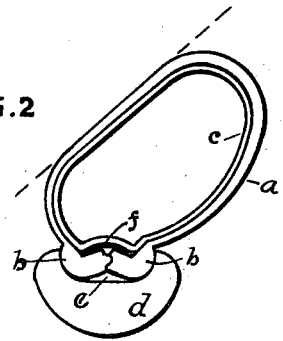
Figure 3:
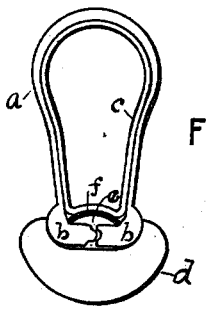
Figure 4:
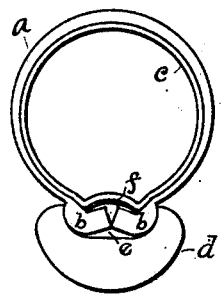

Figure 1 is a transverse section of the tire, showing its appearance when inflated. Fig. 2 illustrates the position of the sheath under a side strain. Fig. 3 shows the position the sheath must be in before either bead can be removed from the rim. Fig. 4 is the same tire without the interlocking feature.

Similar letters refer to similar parts throughout the several views.

Referring to the drawings, $a$ is the tire-sheath, forming the restraining-jacket for the air-tube $c$. The beaded edges $b\ b$ of the sheath $a$ are designed to rest in the groove $e$ of the rim $d$. The band $f$ encircles the rim and properly forms a part of the same, although it is not rigidly attached. The beads $b\ b$ enter the groove of the rim $a$ in a circular direction on either side of the band $f$, under which they hook. This band takes the strain of inflation, and the outside of the beads are steadied on the edge of the rim in a line with the fulcrum edges of the band. The inner edges of the beads $b\ b$ have cog-like projections that mesh together as the beads approach each other on entering the grooves of the rim in their curved pathways, and when the tire is inflated the outward movement of the side walls carry the inner ends of the beads upward by means of their pivotal action with the edges of the band $f$, thus securely locking them against accidental displacement.

It is obvious that it will be necessary to carry both side walls of the tire inward before either bead can be removed from the rim. This is illustrated in Figs. 2 and 3, the former showing the result of a pressure on one side only, while the latter illustrates a pressure on both sides. As shown in Fig. 4, a tire can be made and be operative with one rim-groove, a substantially-unattached band, and two beads without the interlocking feature; but I prefer to utilize the self-locking feature of the interlocking beads, as with it it is impossible to accidentally detach the tire-sheath.

I claim as my invention—

1. In combination, a wheel-rim with a single groove, a hoop of less width than the groove of the rim, having a fixed diameter greater than the rim at the bottom of the groove, and a tire-sheath having beaded edges; the edges of the hoop serving as pivots around which the beaded edges of the sheath turn in and out of the groove of the rim.

2. In combination, a tire-sheath having beaded edges, a wheel-rim with a single groove, a hoop having a fixed diameter around the edges of which hoop the beaded edges of the tire-sheath turn in and out of the groove of the rim, and means, substantially as described, to prevent an accidental disengaging movement of the beaded sheath edges.

3. In combination, a tire-sheath having attaching-beads, a grooved wheel-rim, a metallic hoop out of contact with the rim, the edges of said hoop serving as pivots around which the beads turn in and out of the groove, and means to lock the beads to prevent an independent outward-turning movement, substantially as described.

4. In combination, a tire-sheath having attaching-beads, a grooved wheel-rim, a metallic hoop out of contact with the rim, the edges of said hoop serving as pivots around which the beads turn in and out of the groove, the beads arranged to form a stop, the one for the other to prevent the outward-turning movement of either bead independent of the other.

5. A tire-sheath having attaching-beads and a wheel-rim with a single groove, substantially as described, in combination with a metallic hoop independent of the rim or tire-sheath, around the edges of which the beads turn in a circular direction in and out of the groove of the rim.

6. A rim of a wheel having a single groove, and a divided tire-sheath provided with attaching-beads that engage pivotally with the edges of a metallic band which encircles the rim out of contact therewith and serves to confine the beads to the groove when the tire is inflated, substantially as described.

PARDON W. TILLINGHAST.

Witnesses:
ALVA L. BURDICK,
S. K. DALGLIESH.